Patented Dec. 1, 1925.

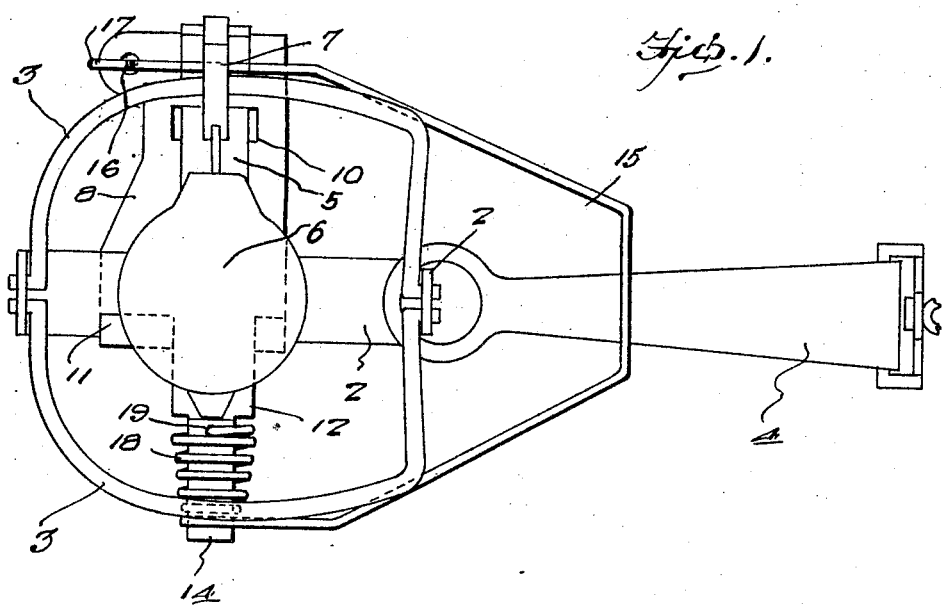
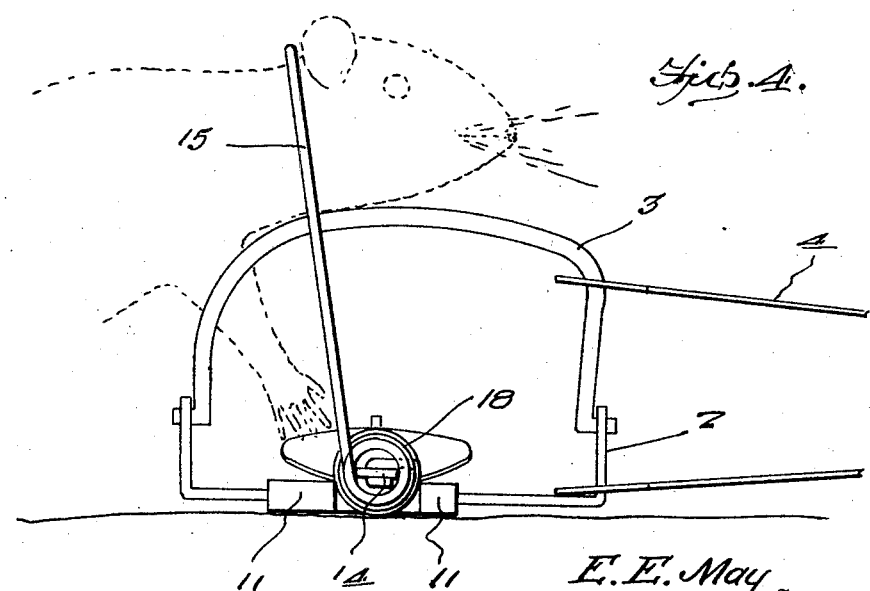

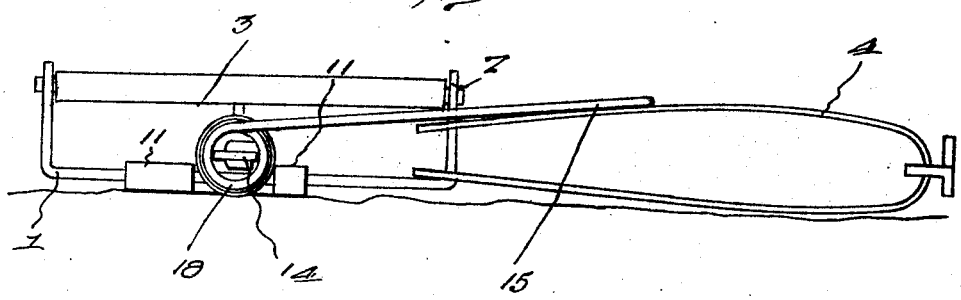
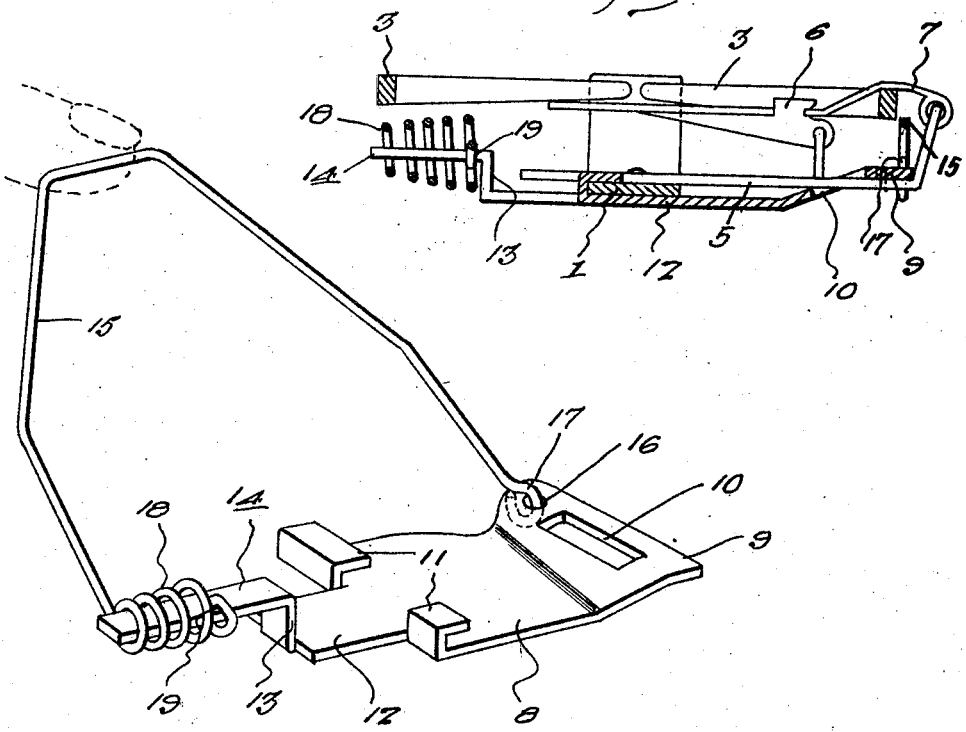

1,563,772

UNITED STATES PATENT OFFICE.

EDWARD E. MAY, OF PARKER, SOUTH DAKOTA.

ANIMAL TRAP.

Application filed February 23, 1924. Serial No. 694,695.

*To all whom it may concern:*

Be it known that I, EDWARD E. MAY, a citizen of the United States, residing at Parker, in the county of Turner and State of South Dakota, have invented certain new and useful Improvements in Animal Traps, of which the following is a specification.

This invention relates to improvements in attachments for animal traps.

An object of the invention resides in providing an animal trap attachment for the usual well known type of steel traps having a pair of spring operated pivoted jaw members including a plate adapted to be secured to the trap, and a pivoted spring jaw member mounted on the plate and adapted for movement in a plane transverse to the plane of movement of the jaw members of the trap for engagement over the body of an animal caught in the trap for assisting in holding the animal in the jaws and for preventing it from freeing itself from the jaw.

In carrying out the above object, it will be readily appreciated that in the usual jaw trap, animals caught therein frequently free themselves when only the legs of the animals are caught between the jaws by pulling and jerking on the traps so that they free their legs from the jaws and escape.

In carrying out the above object of the invention, it is desired to overcome this disadvantage in jaw traps, and prevent the animal caught therein from freeing itself by jerking and pulling away from the trap. This is accomplished by providing a holding member adapted to swing in position, after the jaws have acted to trap the animal, over the head or neck and hold it down close to the jaws so that it will be prevented from pulling away from the trap and thus freeing its legs or other portions which are held between the jaws.

Another object of the invention is to provide a trap attachment of such a character that it is readily applicable to the types of traps now in use, and which may be produced at a relatively small cost by reason of its simplicity in structure.

The invention comprehends other features in the details of construction and arrangement of parts which are more clearly and particularly pointed out in the following detailed description and in the claims directed to a prefered form of the invention, it being understood, however, that variations may be made from the structure set forth from within the spirit and scope of the appended claims.

In the drawings, forming a part of this application:

Figure 1 is a plan view of the trap in set position having the holding attachment applied thereto and also in its set position ready for operation.

Figure 2 shows a side elevation of the trap showing the parts in set position as shown in Figure 1.

Figure 3 is a transverse sectional view through the trap showing the manner of attaching the plate carrying the auxiliary retaining member to a jaw trap of well known construction.

Figure 4 is a side elevation of the trap in sprung position showing the retainer in position to hold an animal between the jaws of the trap.

Figure 5 is an assembled perspective view of the retainer attachment per se.

1 indicates a spring jaw trap having a jaw carrying base member 2 pivotally mounting a pair of cooperating jaws 3 adapted for operation by the spring member 4, a transverse member 5 being fastened to the center of the base and provided for pivotally mounting the bait holder 6 and the latching lever 7 for holding the jaws in open position. This structure forms the subject matter of a well known type of trap now in use, and constitutes no part of the present invention.

As an attachment for the above mentioned type of trap, this invention includes a plate 8 provided with an offset end at 9 formed with an elongated slot 10 adapted for passage of the transverse member 5 of the trap proper, the other end portion of the plate being formed with a pair of securing hooked lugs 11 provided by forming reverse bends in the material of the plate at the side edges thereof, the central portion of this last mentioned end of the plate extended beyond the lugs 11 as indicated at 12 which is provided at its ends with a reduced upwardly extending portion 13 terminating in a laterally extending end 14 as clearly illustrated in Figure 5. The hooked lugs are adapted to engage over one longitudinal edge of the base plate 2 as shown in Figure 3, whereby to permit the attachment to be detachably held in place. An auxiliary retaining member or jaw 15 of substantially U-shaped form has one end extended through an opening 16 in the offset end portion 9 of the plate 8 to afford hinged connection with the plate as indicated at 17. The opposite end of the arm of this U-shaped member is formed into an angularly and inwardly directed spring coil 18. It will be noticed from Figure 1 that the aforesaid extension 14 projects through and beyond the coil, and the free end of the innermost coil is secured in any appropriate way in an opening 19 formed in this extension. Obviously the coil 18 serves to automatically spring the retainer from the set position shown in Figure 1 to the operative position shown in Figure 4 after the trip mechanism is actuated.

In use, the hooked lugs 11 are hooked over the central portion of the base plate 2, the hooks being spaced apart to straddle the right angularly disposed strip or member 5. This method of connection is clear from Figure 2. As shown in this figure the outer end of the member 5 extends through the slot 10 and beyond it, so that the pivoted latch 7 may be swung down and over the adjacent jaw 3 to be engaged with the keeper of the trip 6. As shown in Figure 1 the bight portion of the wire 15 now rests upon the upper arm of the spring 4, and the intermediate portions of the arms of this wire 15 are disposed beneath the jaws 3. Under this arrangement it will be seen that the coiled spring 18 aids in the closing of the jaws and thus cooperates with the flat spring 4. When the animal springs the trap by operating the trip mechanism 6 in the usual way, the jaws 3 will swing to closed position to grip the animal in the customary way. Simultaneously however with the closing of the jaws, the auxiliary retaining member will, under the action of its spring move up to operative position such as shown in Figure 4 and literally clamp the animal between the jaws 3.

It will therefore, be apparent that an attachment for jaw traps has been provided which will increase the catching efficiency of the trap by holding the animal caught in the jaws thereof close to the trap and preventing it from pulling away from the trap.

It is to be further understood that the above structure may be used in the construction of new traps wherein it will form a permanent part of the trap in a manner which will be apparent from the above description.

This trap will effectively catch minks, weasels, muskrats, and the like which usually free themselves when caught by the feet by chewing them off, as the U-shaped member will hold the animal down on the trap and prevent it from effecting an escape.

What is claimed is:

1. An animal trap of the class described comprising a jaw carrying base member, a pair of cooperating jaws pivotally mounted upon said member, resilient means for closing said jaws, trip mechanism in association with said member and jaws for holding the latter open, a base plate extending at right angles to said jaw carrying member and provided with hooks to take over said member, and a U-shaped retaining member pivotally connected at one end with said plate, having a coiled spring at its opposite end connected with said plate, having its bight portion contacting said jaw closing means, and having the intermediate portion of its arms disposed beneath and engaged with said jaws for assisting in closing the latter.

2. In an animal trap of the class described, a base plate having one end offset upwardly and provided with an elongated slot, the intermediate portion of the plate being formed with hooked lugs, and the adjacent portion of the plate being provided with an outwardly extending arm, a substantially U-shaped wire retaining member having the free end of one of its arms formed with an eye hingedly connected with the offset end of said plate, the free end of the remaining arm being fashioned to form a coiled spring surrounding and connected with said arm.

In testimony whereof I affix my signature.

EDWARD E. MAY.